(12) United States Patent
Yang et al.

(10) Patent No.: US 8,776,232 B2
(45) Date of Patent: Jul. 8, 2014

(54) CONTROLLER CAPABLE OF PREVENTING SPREAD OF COMPUTER VIRUSES AND STORAGE SYSTEM AND METHOD THEREOF

(75) Inventors: Jiunn-Yeong Yang, Keelung (TW); Chien-Fu Lee, Yunlin County (TW); Ming-Chou Wu, Hsinchu (TW)

(73) Assignee: Phison Electronics Corp., Miaoli (TW)

( * ) Notice: Subject to any disclaimer, the term of this patent is extended or adjusted under 35 U.S.C. 154(b) by 939 days.

(21) Appl. No.: 12/504,947

(22) Filed: Jul. 17, 2009

(65) Prior Publication Data

US 2010/0287616 A1 Nov. 11, 2010

(30) Foreign Application Priority Data

May 5, 2009 (TW) .............................. 98114877 A (51) Int. Cl.
*G06F 12/14* (2006.01)
*G06F 21/56* (2013.01)
*G06F 21/14* (2013.01)
*G06F 21/80* (2013.01)
*G06F 21/85* (2013.01)
*G06F 21/60* (2013.01)
*H04L 29/06* (2006.01)

(52) U.S. Cl.
CPC .............. *G06F 21/566* (2013.01); *G06F 21/14* (2013.01); *G06F 21/80* (2013.01); *G06F 21/85* (2013.01); *G06F 21/606* (2013.01); *G06F 21/56* (2013.01); *H04L 63/145* (2013.01)
USPC .................... 726/24; 726/22; 726/23; 726/25

(58) Field of Classification Search
CPC ....... G06F 21/566; G06F 21/14; G06F 21/80; G06F 21/85; G06F 21/606; G06F 21/56; H04L 63/145

USPC ....................................................... 726/22–25
See application file for complete search history.

(56) References Cited

U.S. PATENT DOCUMENTS 6,941,405 B2 * 9/2005 Morrow ......................... 710/305
6,993,618 B2 * 1/2006 Chen et al. .................... 710/305

(Continued)

FOREIGN PATENT DOCUMENTS

| CN | 1801122 | | 7/2006 | |
|---|---|---|---|---|
| KR | 2006112941 | * | 4/2005 | ............. G06F 15/00 |
| WO | WO98/33106 | * | 7/1998 | ................ G06F 1/00 |

OTHER PUBLICATIONS

Chinese First Examination Report of China Application No. 200910140786.6 dated Nov. 1, 2011.

*Primary Examiner* — Kambiz Zand
*Assistant Examiner* — Tongoc Tran
(74) *Attorney, Agent, or Firm* — J.C. Patents (57) ABSTRACT

A controller capable of preventing spread of computer viruses is provided. The controller includes a microprocessor unit, and a first interface unit, a second interface unit, a comparing unit and a filter unit which are coupled to the microprocessor unit. The first interface unit is coupled to a storage medium, and the second interface unit is coupled to a computer host. The comparing unit determines whether data read form the storage medium by the computer host is an automatic executing file. And, the filter unit replaces the read data with a predetermined data and transmit the predetermined data to the computer host when the read data is the automatic executing file. Accordingly, the controller is capable of preventing the spread of the computer viruses designed in an automatic executing file.

22 Claims, 8 Drawing Sheets

(56) References Cited

U.S. PATENT DOCUMENTS

| | | | |
|---|---|---|---|
| 7,762,470 B2 * | 7/2010 | Finn et al. | 235/492 |
| 8,307,435 B1 * | 11/2012 | Mann et al. | 726/22 |
| 2005/0086413 A1 * | 4/2005 | Lee et al. | 710/313 |
| 2005/0138288 A1 * | 6/2005 | Chou et al. | 711/115 |
| 2005/0182881 A1 * | 8/2005 | Chou et al. | 710/301 |
| 2005/0258243 A1 * | 11/2005 | Hsieh | 235/441 |
| 2009/0038011 A1 * | 2/2009 | Nadathur | 726/24 |
| 2009/0254993 A1 * | 10/2009 | Leone | 726/25 |
| 2010/0043072 A1 * | 2/2010 | Rothwell | 726/24 |
| 2010/0154062 A1 * | 6/2010 | Baram et al. | 726/24 |
| 2011/0138378 A1 * | 6/2011 | Chang et al. | 717/175 |
| 2011/0154503 A1 * | 6/2011 | Stewart et al. | 726/26 |

* cited by examiner

CONTROLLER CAPABLE OF PREVENTING SPREAD OF COMPUTER VIRUSES AND STORAGE SYSTEM AND METHOD THEREOF

CROSS-REFERENCE TO RELATED APPLICATION

This application claims the priority benefit of Taiwan application serial no. 98114877, filed on May 5, 2009. The entirety of the above-mentioned patent application is hereby incorporated by reference herein and made a part of this specification.

BACKGROUND

1. Technology Field

The present invention relates to a controller. More particularly, the present invention relates to a controller capable of preventing spread of computer viruses designed in an automatic executing file, a storage system and a method thereof.

2. Description of Related Art

Along with the widespread of digital cameras, mobile phones, and MP3 in recently years, the consumers' demand to storage media has increased drastically too. For example, a flash drive is a portable storage device using an NAND flash memory as the storage medium.

As the portable storage devices are widely used, it is discovered that more and more computer viruses can spread via the portable storage devices. Taking the flash drive as an example, as long as the flash drive infected by the viruses is plugged into a computer host, the computer host itself is also infected by the viruses, which may cause a serious damage. For example, the computer viruses spreading via the flash drive rewrites a content of an automatic executing file, and when the flash drive is plugged into the computer host, the computer host may automatically execute the content of the automatic executing file, so that the computer virus hidden in the flash drive may infect the computer host.

Once the computer host is infected by the computer virus, the computer virus then resides in processing programs of an operating system of the computer host, and the computer virus can detect an event recorder to get to know a current operating state of the computer host. Then, when another flash drive is connected to the computer host, the operating system automatically notifies such variation to the event recorder, and the computer virus can detect that the flash drive is connected by detecting the event recorder, so that the computer virus tries to copy itself to the connected flash drive. Since the flash drive is generally set to a readable and writable mode, the computer virus can be successfully written into the connected flash drive to modify the automatic executing file and write the related virus program.

Accordingly, as the portable storage devices are widely used for data exchanging among users, such type of computer viruses is quickly spread and causes a chain infection.

Nothing herein should be construed as an admission of knowledge in the prior art of any portion of the present invention. Furthermore, citation or identification of any document in this application is not an admission that such document is available as prior art to the present invention, or that any reference forms a part of the common general knowledge in the art.

SUMMARY

The present invention is directed to a controller, which can prevent spread of computer viruses from a storage medium to a computer host.

The present invention is directed to a storage system, which can prevent spread of computer viruses from a storage medium to a computer host.

The present invention is directed to a method for preventing spread of computer viruses, by which spread of computer viruses from a storage medium to a computer host can be prevented.

An exemplary embodiment of the present invention provides a controller including a microprocessor unit, a first interface unit, a second interface unit, and a data management unit. The first interface unit is coupled to the microprocessor unit, and is used to connect a storage medium. The second interface unit is coupled to the microprocessor unit, and is used to connect a computer host. The data management unit is coupled to the microprocessor unit, and is used to transmit a predetermined data to the computer host to replace data read from the storage medium by the computer host when the data read from the storage medium by the computer host is an automatic executing file.

An exemplary embodiment of the present invention provides a storage system having a function of preventing spread of computer viruses, which includes a controller, a connector, a storage medium and a data management unit. The connector is coupled to the controller, and is used to connect a computer host having an operating system. The storage medium is coupled to the controller, and is used to store data to be written by the computer host. The data management unit is used to transmit a predetermined data to the computer host to replace data read from the storage medium by the computer host when the data read from the storage medium by the computer host is an automatic executing file.

An exemplary embodiment of the present invention provides a method for preventing spread of computer viruses. The method can be described as follows. First, a storage device is provided, and is coupled to a computer host, wherein the computer host has an operating system. Next, it is determined whether data read from the storage device by the operating system is an automatic executing file. Finally, a predetermined data is transmitted to the operating system to replace data read from the storage device by the operating system when the data read from the storage device by the operating system is the automatic executing file.

The present invention can prevent the computer host from executing the automatic executing file rewritten by the viruses, so as to prevent the spread of the computer viruses.

In order to make the aforementioned and other features and advantages of the present invention comprehensible, several exemplary embodiments accompanied with figures are described in detail below.

It should be understood, however, that this Summary may not contain all of the aspects and exemplary embodiments of the present invention, is not meant to be limiting or restrictive in any manner, and that the invention as disclosed herein is and will be understood by those of ordinary skill in the art to encompass obvious improvements and modifications thereto.

BRIEF DESCRIPTION OF THE DRAWINGS

The accompanying drawings are included to provide a further understanding of the invention, and are incorporated in and constitute a part of this specification. The drawings illustrate exemplary embodiments of the invention and, together with the description, serve to explain the principles of the invention.

DESCRIPTION OF THE EXEMPLARY EMBODIMENTS

A method for preventing spread of computer viruses of the present invention is to recognize whether data read from a storage device by an operating system of a computer host is an automatic executing file, and if the read data is the automatic executing file, a predetermined data is transmitted to the operating system, so that a circumstance that the computer virus infects the operating system of the computer host by executing the automatic executing file can be prevented. Reference will now be made in detail to the present preferred exemplary embodiments of the invention, examples of which are illustrated in the accompanying drawings. Wherever possible, the same reference numbers are used in the drawings and the description to refer to the same or like parts. Herein, the automatic executing file is a kind of fie which can be executed automatically by the operation system. For example, in the exemplary embodiments, the automatic executing file is an AUTORUN.INF which can be executed automatically by Microsoft Windows. It should be noticed that in another exemplary embodiment of the present invention, the automatic executing file can also be other automatic executing file which can be executed automatically by other operation systems.

Exemplary embodiments of the present invention may comprise any one or more of the novel features described herein, including in the Detailed Description, and/or shown in the drawings. As used herein, "at least one", "one or more", and "and/or" are open-ended expressions that are both conjunctive and disjunctive in operation. For example, each of the expressions "at least on of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

First Exemplary Embodiment

Figure 1:
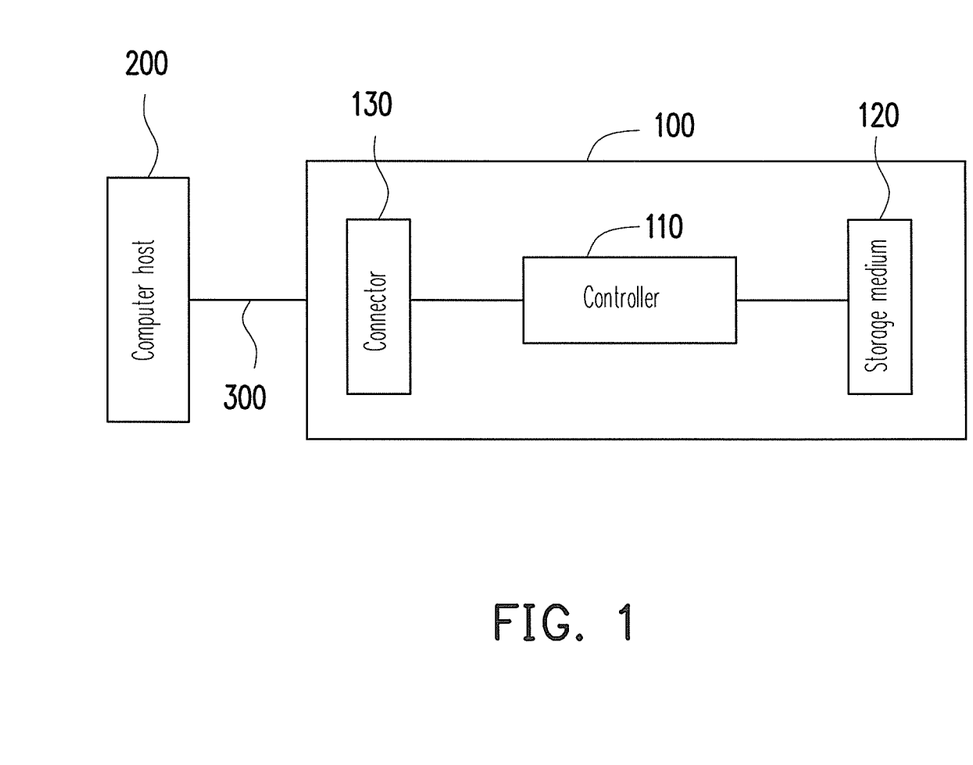
FIG. 1 is a schematic block diagram illustrating a storage system according to a first exemplary embodiment of the present invention.

FIG. 1 is a schematic block diagram illustrating a storage system according to a first exemplary embodiment of the present invention.

Referring to FIG. 1, a storage device 100 is connected to a computer host 200, so that the computer host 200 can write data into the storage device 100 or read data from the storage device 100. In the present exemplary embodiment, the storage device 100 is a flash memory storage device, for example, a flash drive, a memory card or a solid state drive (SSD). It should be noticed that in another exemplary embodiment of the present invention, the storage device 100 can also be a hard disk (HDD).

The storage device 100 includes a controller 110, a storage medium 120 and a connector 130.

The controller 110 may execute a plurality of logic gate or machine commands implemented in a hardware form or a firmware form to perform operations such as data storing, data reading and data erasing, etc. in coordination with the connector 130 and the storage medium 120. Particularly, the controller 110 can recognize whether data to be read by the computer host 200 is an AUTORUN.INF, and when the data to be read by the computer host 200 is the AUTORUN.INF, the controller 110 transmits a predetermined data to the computer host 200 to replace the read data. Operations of the controller 110 are described in detail below with reference to the accompanying drawings.

The storage medium 120 is coupled to the controller 110 for storing data under control of the controller 110. In the present exemplary embodiment, the storage medium 120 is a multi level cell (MLC) NAND flash memory. However, it should be noticed that the present invention is not limited thereto. In another exemplary embodiment of the present invention, a single level cell (SLC) NAND flash memory or a disk can also be applied.

The connector 130 is coupled to the controller 110, and is used to connect the computer host 200 via a bus 300. In the present exemplary embodiment, the connector 130 is a Universal Serial Bus (USB) connector. However, it should be noticed that the present invention is not limited thereto, and the connector 130 can also be an Serial Advanced Technology Attachment (SATA) connector, an Institute of Electrical and Electronics Engineers (IEEE) 1394 connector, a Peripheral Component Interconnect (PCI) express connector, an Memory Stick (MS) connector, an Multi Media Card (MMC) connector, an Secure Digital (SD) connector, a Compact Flash (CF) connector, an Integrated Drive Electronics (IDE) connector or other suitable connectors.

Figure 2:
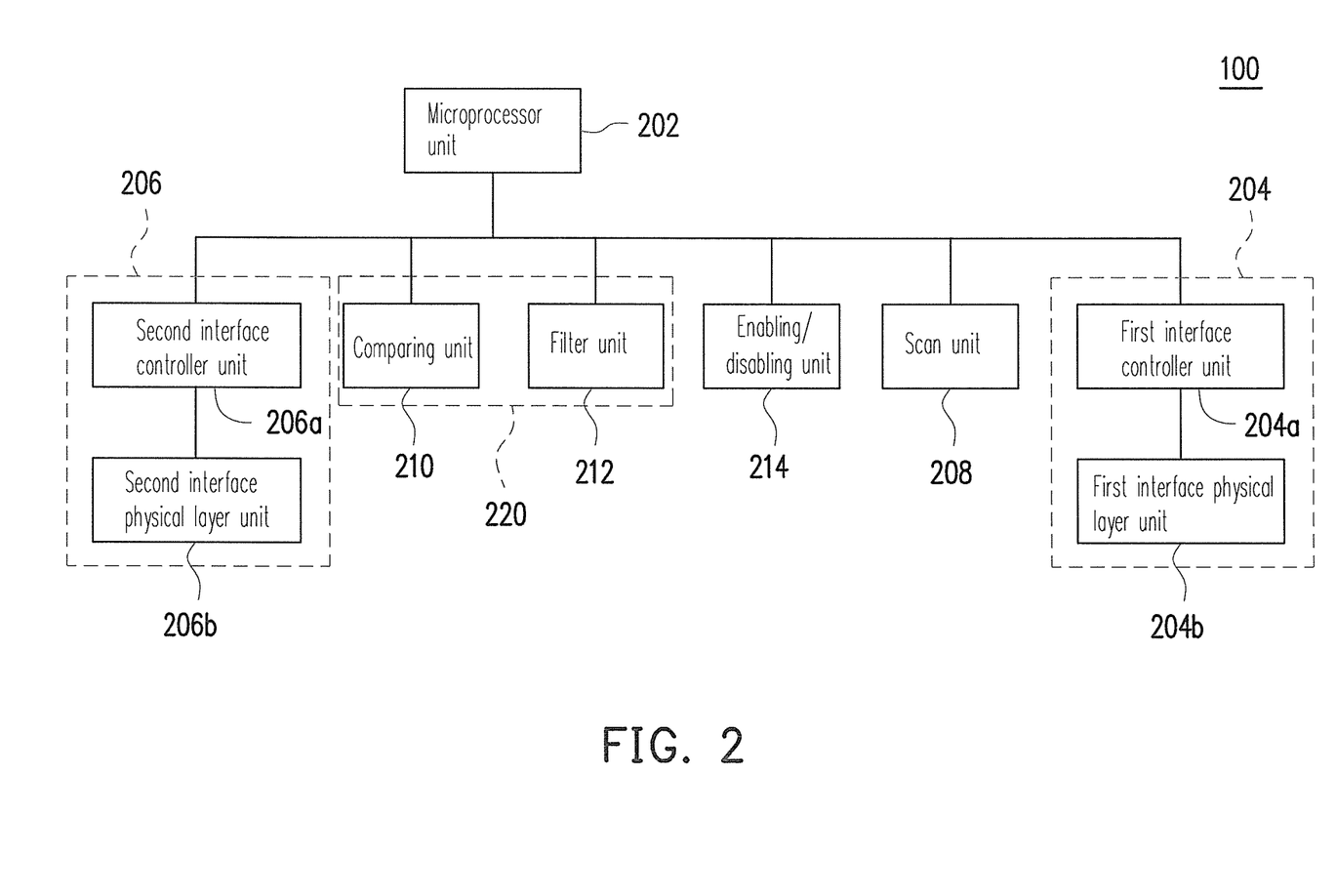
FIG. 2 is a schematic block diagram illustrating a controller of FIG. 1.

FIG. 2 is a schematic block diagram illustrating the controller of FIG. 1.

Referring to FIG. 2, the controller 110 includes a microprocessor unit 202, a first interface unit 204, a second interface unit 206, a scan unit 208 and a data management unit 220.

The microprocessor unit 202 is used to control a whole operation of the controller 110. Namely, operations of all components within the controller 110 are controlled by the microprocessor unit 202.

The first interface unit 204 includes a first interface controller unit 204a and a first interface physical layer unit 204b coupled to the first interface controller unit 204a, wherein the first interface physical layer unit 204b is coupled to the storage medium 120, and the first interface controller unit 204a is used to process data to be transmitted to the storage medium 120 or recognizing data received from the storage medium 120. Namely, data to be written into the storage medium 120 is converted into a format that can be accepted by the storage medium 120 through the first interface unit 204. For example, in the present exemplary embodiment, the first interface unit 204 is a flash memory interface. It should be noticed that in another exemplary embodiment of the present invention, if the storage medium 120 is a disk, the first interface unit 204 is then a disk interface.

The second interface unit 206 includes a second interface controller unit 206a and a second interface physical layer unit 206b coupled to the second interface controller unit 206a, wherein the second interface physical layer unit 206b is coupled to the connector 130 for connecting the computer host 200, and the second interface controller unit 206a is used to process data to be transmitted to the computer host 200 or data received from the computer host 200. Namely, commands and data sent from the computer host 200 are transmitted to the microprocessor unit 202 through the second interface unit 206. In the present exemplary embodiment, the second interface unit 206 conforms with a USB interface standard. However, it should be noticed that the present invention is not limited thereto, and the second interface unit 206 can also conform with a SATA interface standard, an IEEE 1394 interface standard, a PCI express interface standard, a MS interface standard, a MMC interface standard, a SD interface standard, a CF interface standard, an IDE interface standard or other suitable data transmission interface standards.

The scan unit 208 is coupled to the microprocessor unit 202, and is used to scan the AUTORUN.INF stored in the storage medium 120. In detail, each time when the storage device 100 is coupled to the computer host 200 and is initialised, the scan unit 208 scans a file allocation table (FAT) in a disk accessing area of the storage medium 120, and determines an address storing the AUTORUN.INF according to the FAT, and records the address as a tag address. For example, the scan unit 208 may record the tag address in an address list.

Figure 3:
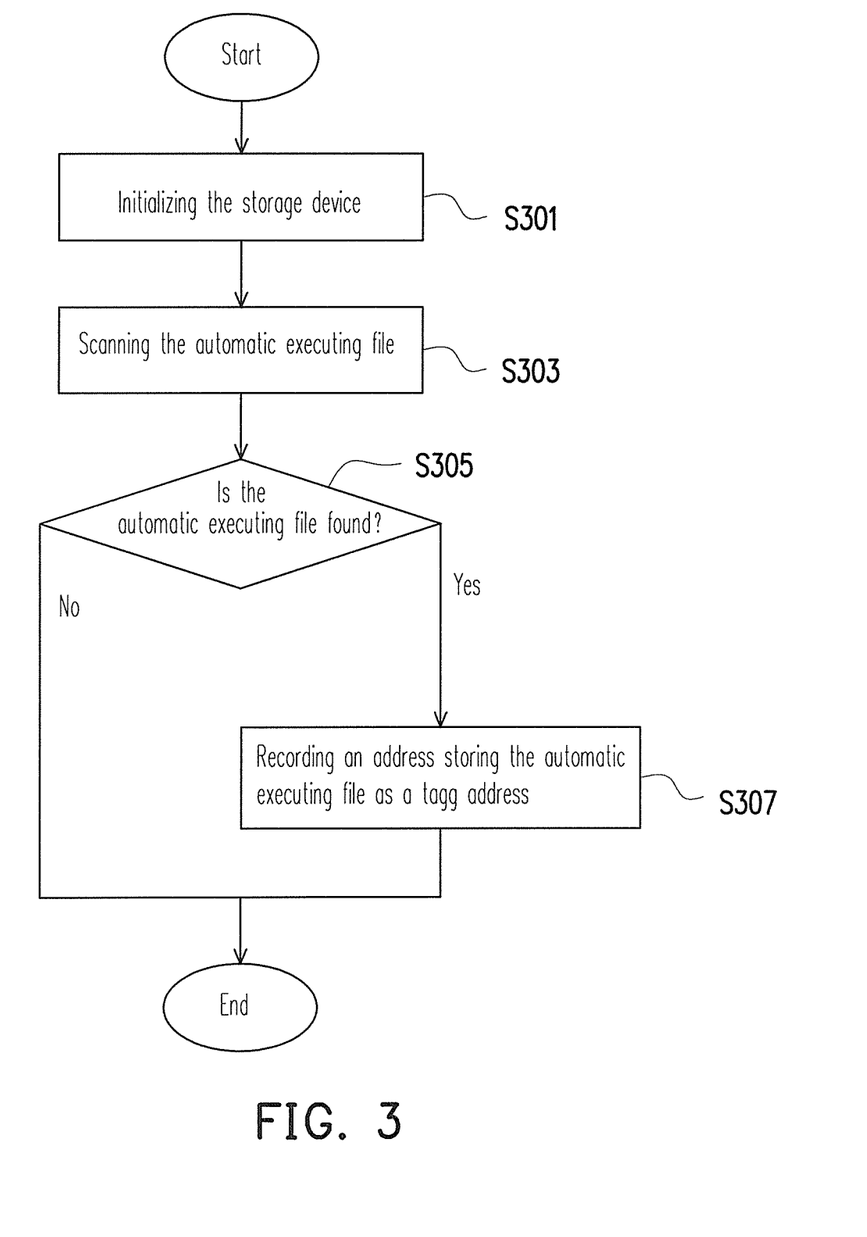
FIG. 3 is a flowchart illustrating a method of recording a tag address according to an exemplary embodiment of the present invention.

FIG. 3 is a flowchart illustrating a method of recording the tag address according to an exemplary embodiment of the present invention.

Referring to FIG. 3, when the storage device 100 is coupled to the computer host 200, in step S301, the storage device 100 is initialised. Next, in step S303, the scan unit 208 scans the automatic executing file. Next, in step S305, it is determined whether the automatic executing file is found, and if the automatic executing file is found, in step S307, the address of the automatic executing file is tagged and stored. It should be noticed that in the exemplary embodiment of the present invention, the automatic executing file is an AUTORUN.INF.

Referring to FIG. 2 again, the data management unit 220 is coupled to the microprocessor unit 202, and includes a comparing unit 210 and a filter unit 212.

The comparing unit 210 is used to determine whether the data read by the computer host 200 is the AUTORUN.INF. In detail, the comparing unit 210 determines whether the address accessed by the computer host 200 is the tag address recorded by the scan unit 208, and if the address accessed by the computer host 200 is the tag address recorded by the scan unit 208, the comparing unit 210 then determines that the data read by the computer host 200 is the AUTORUN.INF.

The filter unit 212 is coupled to the comparing unit 210, and is used to replace the AUTORUN.INF by a predetermined data when the comparing unit 210 determines that the data read by the computer host 200 is the AUTORUN.INF. In detail, since the AUTORUN.INF has been probably modified by a computer virus, when the comparing unit 210 determines that the data read by the computer host 200 is the AUTORUN-.INF, the filter unit 212 transmits the predetermined data to the computer host 200, so that none operation is executed by the computer host 200 when the computer host 200 reads the predetermined data. Therefore, the spread of the computer virus to computer host 200 due to the computer host 200 executes the AUTORUN.INF can be avoided. For example, in the present exemplary embodiment, a file with a content of "Open=" (i.e., a blank follows behind "Open", in other words, nothing follows "Open", so that no operation is performed by the computer host 200) is used as the predetermined data. Moreover, in another exemplary embodiment of the present invention, the predetermined data can be a random number or a fixed number with a specific information length.

In another exemplary embodiment of the present invention, the controller 110 further includes an enabling/disabling unit 214. The enabling/disabling unit 214 is coupled to the microprocessor unit 202, and is used to enable/disable the data management unit 220. In detail, when a user of the storage device 100 wants to enable a function of preventing the spread of the computer viruses, the microprocessor unit 202 instructs the enabling/disabling unit 214 to enable the data management unit 220, so as to avoid executing the AUTORUN.INF stored in the storage medium 120. Comparatively, if the user of the storage device 100 wants to disable the function of preventing the spread of the computer viruses, the microprocessor unit 202 instructs the enabling/disabling unit 214 to disable the data management unit 220, so as to execute the AUTORUN.INF stored in the storage medium 120.

It should be noticed that as described above, although the scan unit 208, the comparing unit 210, the filter unit 212 and the enabling/disabling unit 214 are implemented in the controller 110 in a hardware form, the present invention is not limited thereto. In another exemplary embodiment, the scan unit 208, the comparing unit 210, the filter unit 212 and the enabling/disabling unit 214 can also be implemented in the controller 110 in a firmware form. For example, a plurality of programs implementing the functions of the scan unit 208, the comparing unit 210, the filter unit 212 and the enabling/disabling unit 214 can be burned in a program memory (for example, a read only memory (ROM)), and this program memory can be embedded in the controller 110. Therefore, during operation of the storage device 100, these programs can be executed by the microprocessor unit 202 to implement the mechanism of preventing the spread of the computer viruses.

In another exemplary embodiment of the present invention, a plurality of the programs implementing the functions of the scan unit 208, the comparing unit 210, the filter unit 212 and the enabling/disabling unit 214 can also be stored in a specific area (for example, a system area used for storing system data in a flash memory or a disk) of the storage medium 120 in a program code form. Similarly, during the operation of the storage device 100, these programs are executed by the microprocessor unit 202.

Figure 4:
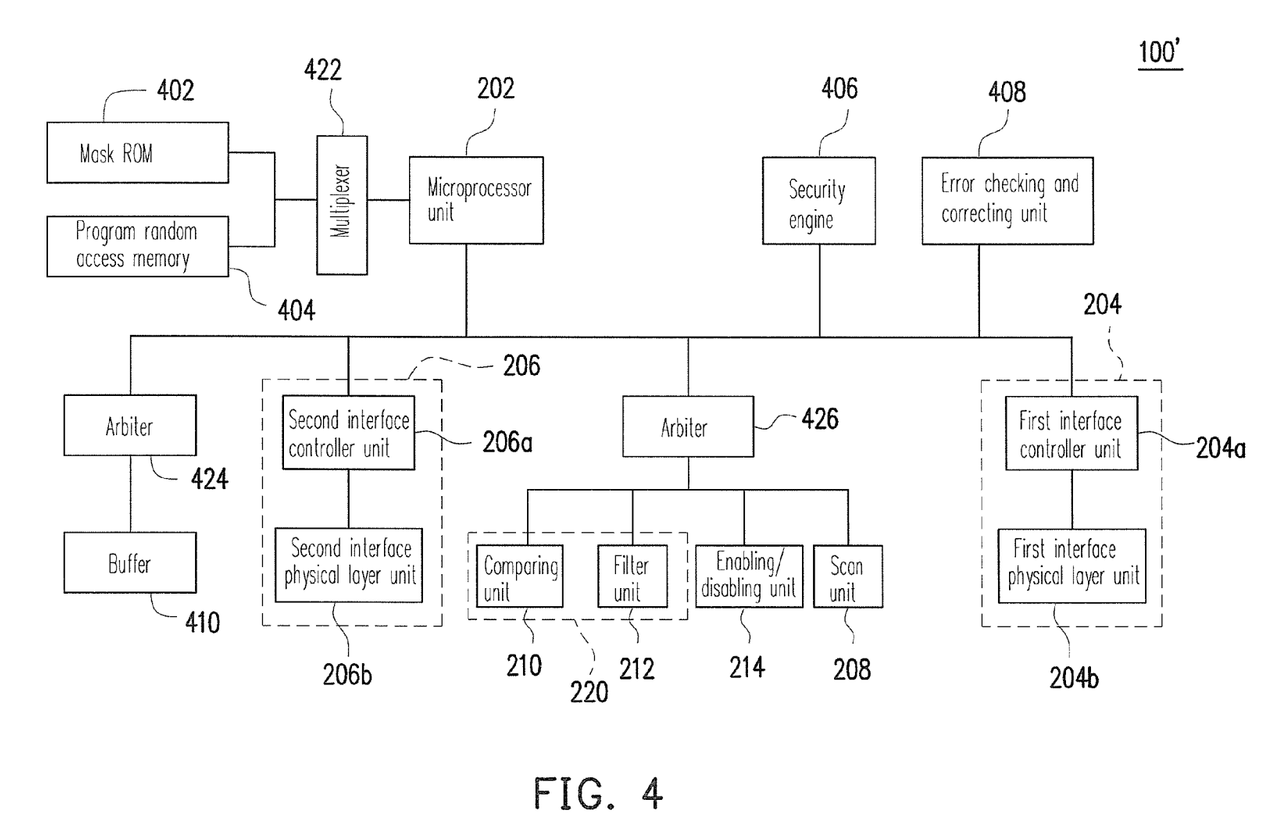
FIG. 4 is a block diagram illustrating a controller according to another exemplary embodiment of the present invention.

Moreover, in another exemplary embodiment of the present invention, the controller can also include other circuit units. FIG. 4 is a block diagram illustrating a controller according to another exemplary embodiment of the present invention.

Referring to FIG. 4, besides the aforementioned microprocessor unit 202, the first interface unit 204, the second interface unit 206, the scan unit 208, the comparing unit 210, the filter unit 212 and the enabling/disabling unit 214, the controller 110' further includes a mask ROM 402, a program random access memory 404, a security engine unit 406, an error checking and correcting unit 408, and a buffer 410. Wherein, the mask ROM 402 and the program random access memory 404 are coupled to the microprocessor unit 202 through a multiplexer 422, and the buffer 410 is coupled to the microprocessor unit 202 through an arbiter 424. Moreover, the scan unit 208, the comparing unit 210, the filter unit 212 and the enabling/disabling unit 214 are coupled to the microprocessor unit 202 through an arbiter 426.

The mask ROM 402 is used to store information or program codes of the controller 110'. Particularly, the information or the program codes are not allowed to be changed. The program random access memory 404 is used to temporarily store firmware codes (or control codes) to be executed by the microprocessor unit 202. In detail, since an operation speed of the program random access memory 404 is relatively high, the firmware codes to be executed by the microprocessor unit 202 are first loaded to the program random access memory 404, so as to improve an operation efficiency of the controller 110. For example, in an example that the scan unit 208, the comparing unit 210, the filter unit 212 and the enabling/disabling unit 214 are implemented in a firmware form or a program code form, when the storage device 100 is initialised, the programs implementing the functions of these units are loaded to the program random access memory 404 for being executed by the microprocessor unit 202.

The security engine unit 406 is coupled to the microprocessor unit 202, and is used to encrypt and decrypt data to be written into the storage medium 120, so as to ensure a reliability of the data.

The error checking and correcting unit 408 is coupled to the microprocessor unit 202, and is used to generate an error correcting code according to the data to be written into the storage medium 120 by the computer host 200. When the computer host 200 reads data from the storage medium 120, the error checking and correcting unit 408 performs an error correcting procedure according to the generated error correcting code to ensure a correctness of the data.

The buffer 410 is used to temporarily store data to be written into the storage medium 120 by the computer host 200, or the data to be read from the storage medium 120 by the computer host 200. In the present exemplary embodiment, the buffer 410 is a static random access memory (SRAM). However, it should be noticed that the present invention is not limited thereto, and a dynamic random access memory (DRAM), a magnetoresistive random access memory (MRAM), a phase change random access memory (PRAM), a SLC NAND flash memory or other suitable memories can also be applied.

Based on the aforementioned structure, the storage device 100 of the present exemplary embodiment can prevent the spread of the computer viruses designed in an AUTORUN-.INF form.

Figure 5:
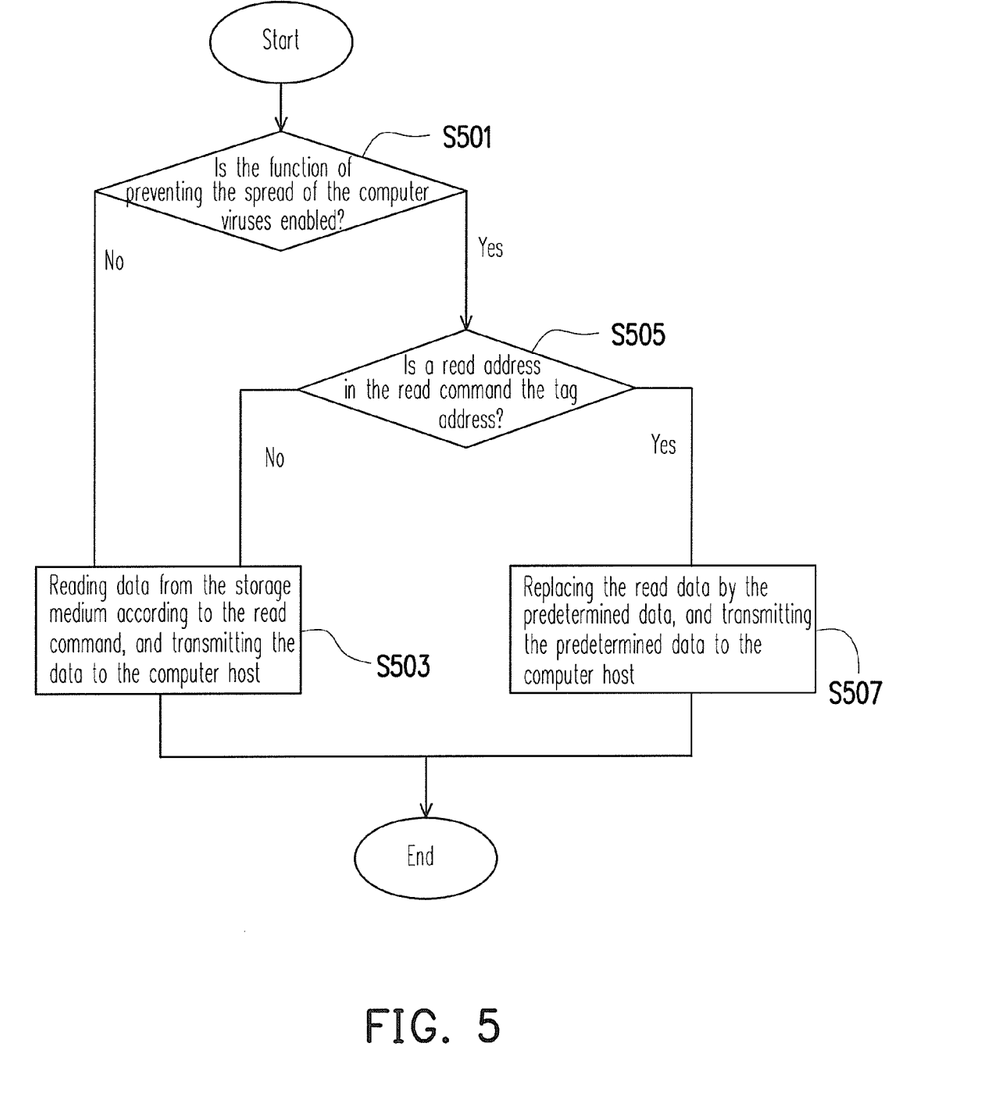
FIG. 5 is a flowchart illustrating a method for preventing spread of computer viruses according to a first exemplary embodiment of the present invention.

FIG. 5 is a flowchart illustrating a method for preventing spread of the computer viruses according to the first exemplary embodiment of the present invention.

Referring to FIG. 5, after the storage device 100 executes the steps of FIG. 3, and is initialised, when the storage device 100 receives a read command from the computer host 200, first, in step S501, it is determined whether the function of preventing the spread of the computer viruses is enabled (i.e. whether the data management unit 220 is enabled). If the function of preventing the spread of the computer viruses is disabled, in step S503, data is read from the storage medium 120 according to the read command, and is transmitted to the computer host 200.

If the function of preventing the spread of the computer viruses is enabled, in step S505, it is determined whether a read address in the read command is the tag address. If the read address in the read command is not the tag address, the step S503 is executed. Conversely, if the read address in the read command is the tag address, in step S507, the read data is replaced by the aforementioned predetermined data, and the predetermined data is transmitted to the computer host 200.

Second Exemplary Embodiment

Figure 6:
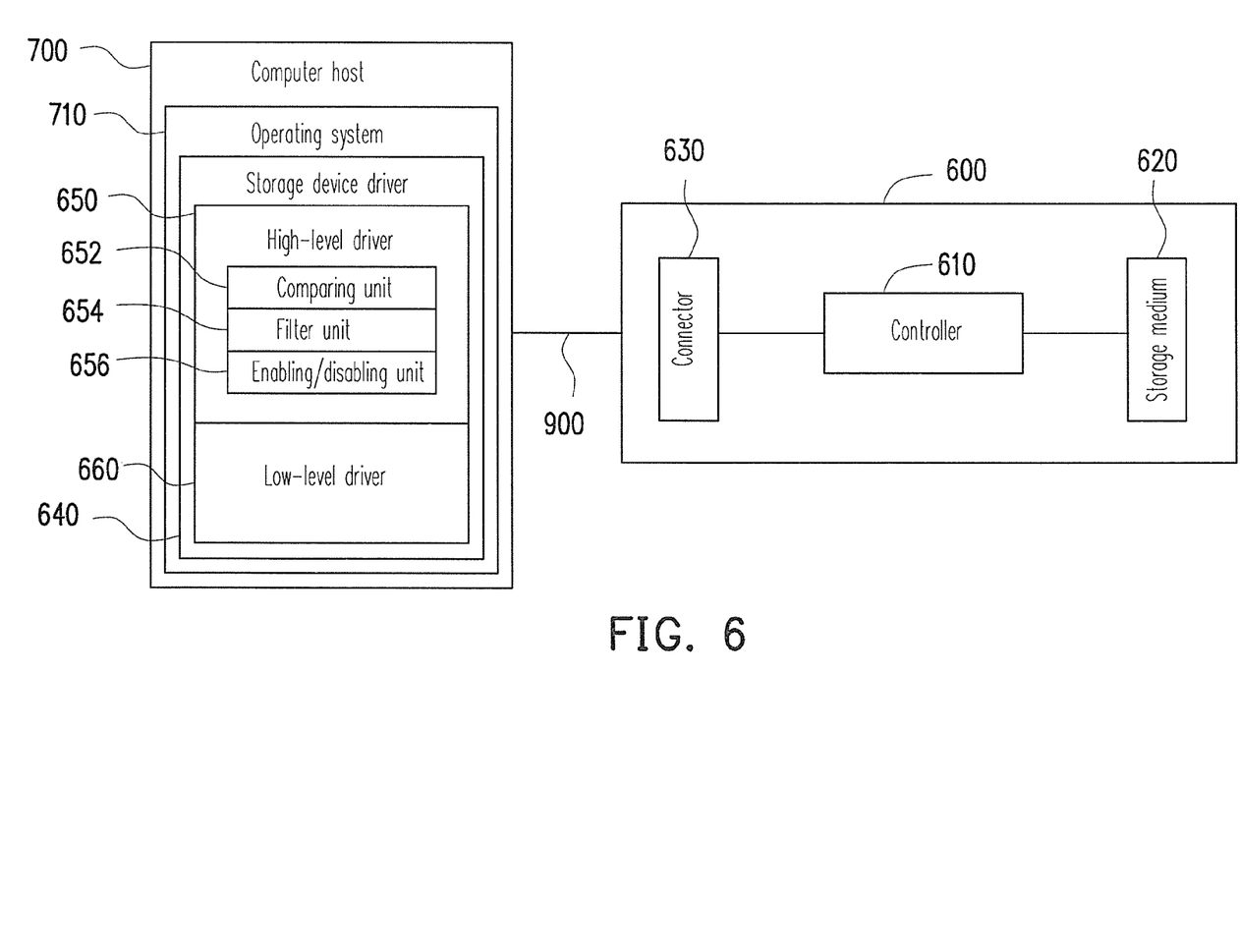
FIG. 6 is a block diagram illustrating a storage system according to a second exemplary embodiment of the present invention.

FIG. 6 is a block diagram illustrating a storage system according to a second exemplary embodiment of the present invention.

The storage system includes a storage device 600 and a storage device driver 640.

The storage device 600 includes a controller 610, a storage medium 620 and a connector 630.

The controller 610 may execute a plurality of logic gate or machine commands implemented by hardware or firmware to perform operations such as data storing, data reading and data erasing, etc. in coordination with the connector 630 and the storage medium 620.

The storage medium 620 is coupled to the controller 610, and is used to store data under control of the controller 610. In the present exemplary embodiment, the storage medium 620 is an MLC NAND flash memory. However, it should be noticed that the present invention is not limited thereto. In another exemplary embodiment of the present invention, an SLC NAND flash memory or a disk can also be applied.

The connector 630 is coupled to the controller 610, and is used to connect a computer host 700 via a bus 900. In the present exemplary embodiment, the connector 630 is a USB connector. However, it should be noticed that the present invention is not limited thereto, and the connector 630 can also be an SATA connector, an IEEE 1394 connector, a PCI express connector, an MS connector, an MMC connector, an SD connector, a CF connector, an IDE connector or other suitable connectors.

The storage device driver 640 is installed in an operating system 710 of the computer host 700, which can be executed by the user or can be directly loaded to the operating system 710. The storage device driver 640 sends a request to the storage device 600 according to a command of the operating system 710. Particularly, the storage device driver 640 includes a high-level driver 650 and a low-level driver 660, wherein when the operating system 710 reads data from the storage device 600, the low-level driver 660 collects the data transmitted in a unit of a sector, and the high-level driver 650 processes the collected data.

In detail, the high-level driver 650 includes a data management unit comprising a comparing unit 652 and a filter unit 654, and an enabling/disabling unit 656.

The comparing unit 652 is used to determine whether the data read by the operating system 710 is the AUTORUN.INF.

The filter unit 654 is used to replace the AUTORUN.INF by a predetermined data when the comparing unit 652 determines that the data read by the operating system 710 is the AUTORUN.INF. For example, a file with a content of "0" is used as the predetermined data. Moreover, in another exemplary embodiment of the present invention, the predetermined data can be a random number or a fixed number with a specific information length.

The enabling/disabling unit 656 is used to enable/disable the comparing unit 652 and the filter unit 654.

Based on the aforementioned structure, the storage system of the present exemplary embodiment can prevent the spread of the computer viruses designed in the AUTORUN.INF form.

Figure 7:
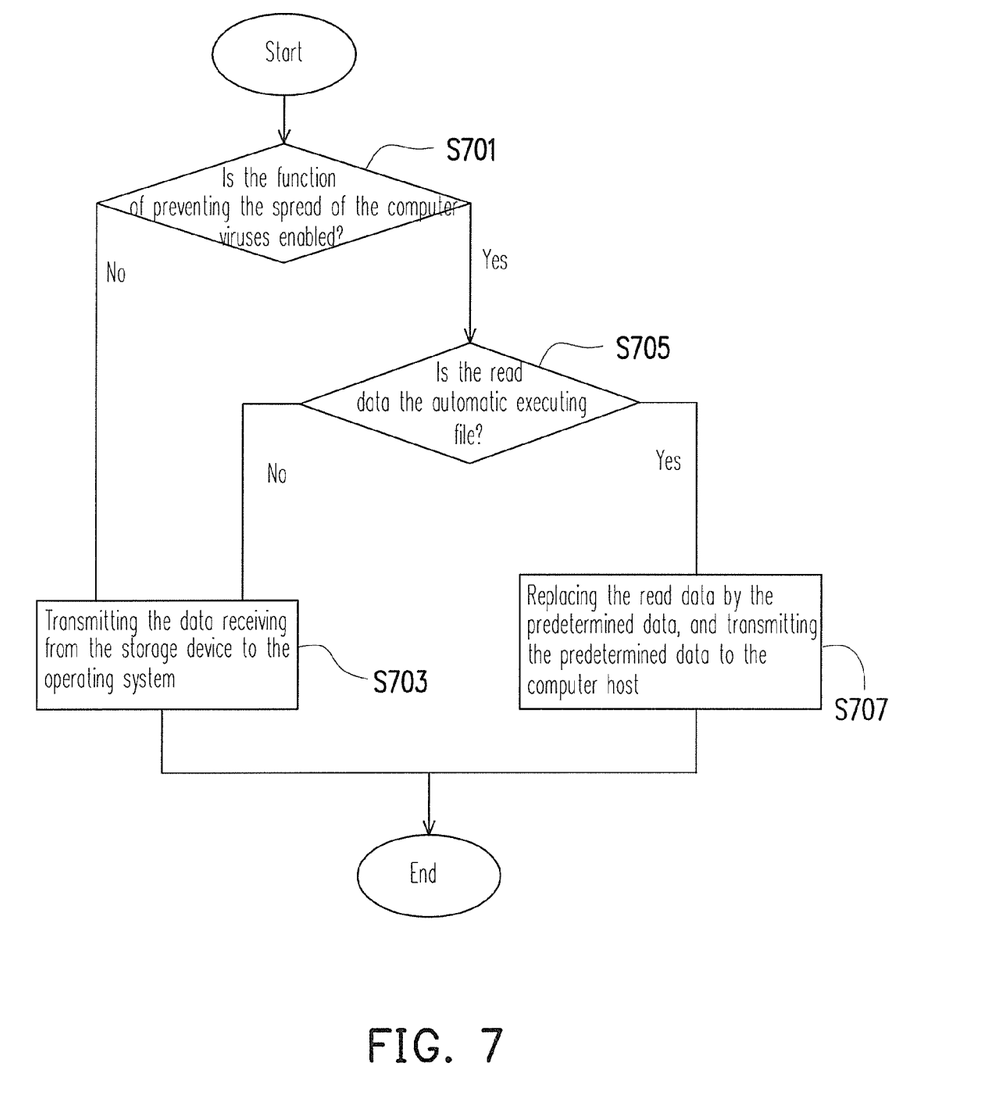
FIG. 7 is a flowchart illustrating a method for preventing spread of computer viruses according to a second exemplary embodiment of the present invention.

FIG. 7 is a flowchart illustrating a method for preventing spread of the computer viruses according to the second exemplary embodiment of the present invention.

Referring to FIG. 7, when the storage device 600 receives data, first, in step S701, it is determined whether the function of preventing the spread of the computer viruses is enabled (i.e. whether the enabling/disabling unit 656 enables the comparing unit 652 and the filter unit 654). If the function of preventing the spread of the computer viruses is disabled, in step S703, the storage device driver 640 transmits the data read from the storage device 600 to the operating system 710.

If the function of preventing the spread of the computer viruses is enabled, in step S705, the comparing unit 652 determines whether the read data is the automatic executing file. If the read data is not the automatic executing file, the step S703 is executed. Conversely, if the read data is the automatic executing file, in step S707, the filter unit 654 replaces the read data by the predetermined data, and transmits the predetermined data to the operating system 710. It should be noticed that in the exemplary embodiment of the present invention, the automatic executing file is an AUTORUN.INF.

Third Exemplary Embodiment

It should be noticed that in the second exemplary embodiment, the comparing unit, the filter unit and the enabling/disabling unit are implemented in the storage device driver, though the present invention is not limited thereto, and in another exemplary embodiment, the comparing unit, the filter unit and the enabling/disabling can also be implemented in a hook application.

Figure 8:
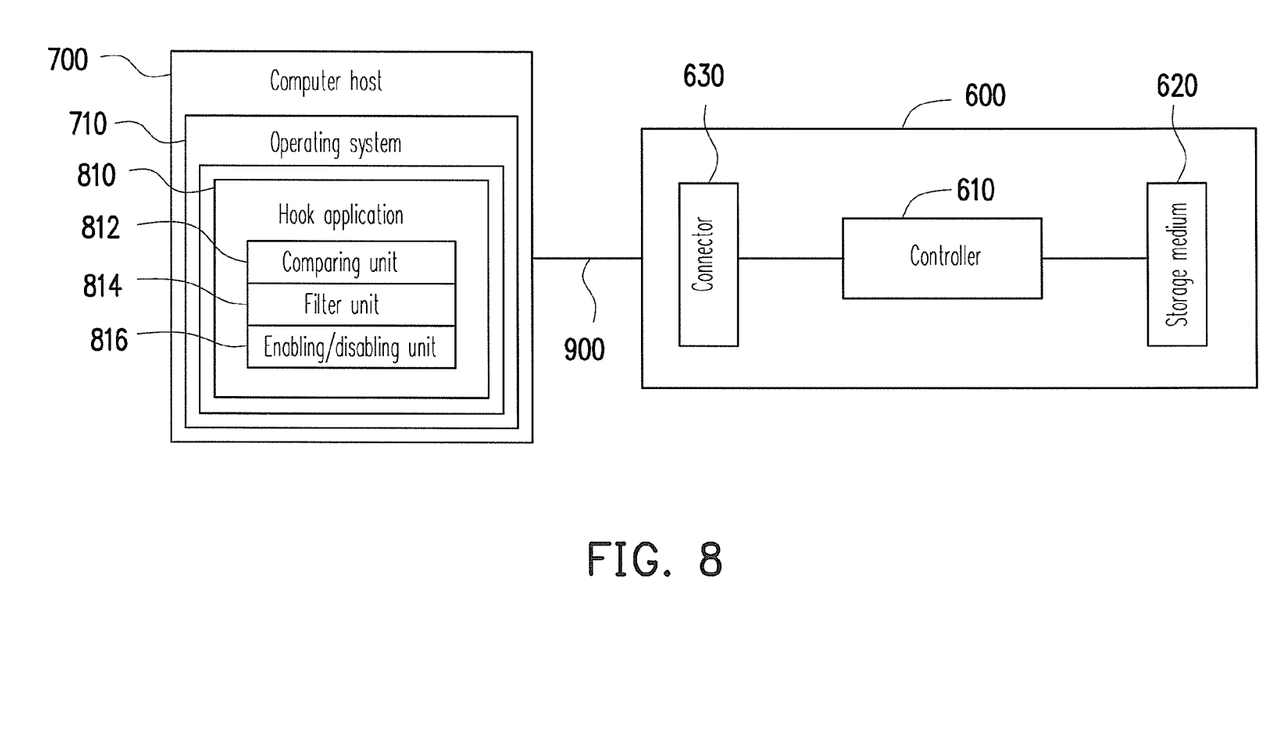
FIG. 8 is a block diagram illustrating a storage system according to a third exemplary embodiment of the present invention.

FIG. 8 is a block diagram illustrating a storage system according to a third exemplary embodiment of the present invention.

Referring to FIG. 8, the storage system includes the storage device 600 and a hook application 810.

The structure of the storage device 600 is as that described in the aforementioned exemplary embodiment, and therefore detailed description thereof is not repeated.

The hook application 810 is an application of a windows operating system. Corresponding operations of the windows operating system are triggered by events, and the hook application 810 can intercept information transmitted by the event to perform a corresponding processing. The hook application 810 can be executed by the user or can be directly loaded to a hook chain of the operating system 710.

The hook application 810 includes a data management unit comprising a comparing unit 812 and a filter unit 814, and an enabling/disabling unit 816.

The comparing unit 812 is used to determine whether the data read by the operating system 710 is the AUTORUN.INF.

The filter unit 814 is used for replacing the AUTORUN.INF by a predetermined data when the comparing unit 812 determines that the data read by the operating system 710 is the AUTORUN.INF. For example, a file with a content of "0" is used as the predetermined data. Moreover, in another exemplary embodiment of the present invention, the predetermined data can be a random number or a fixed number with a specific information length.

The enabling/disabling unit 816 is used for enabling/disabling the comparing unit 812 and the filter unit 814.

It should be noticed that the method for preventing spread of the computer viruses of the present exemplary embodiment is similar to the method of FIG. 7, and therefore detailed description thereof is not repeated.

In summary, the storage system provided by the present invention can detect whether the data read by the computer host is the AUTORUN.INF, and if the read data is the AUTORUN.INF, the predetermined data is used to replace the AUTORUN.INF and is transmitted to the computer host. By such means, the previously described exemplary embodiments of the present invention have many advantages, including preventing spread of the computer virus, wherein the advantages aforementioned not required in all versions of the invention.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A controller, comprising:
a microprocessor unit;
a first interface unit, coupled to the microprocessor unit and configured to connect to a storage medium;
a second interface unit, coupled to the microprocessor unit and configured to connect to a computer host; and
a data management unit, coupled to the microprocessor unit and configured to read data from the storage medium,
wherein the data management unit determines whether the data read from the storage medium is an automatic executing file,
if the data read from the storage medium is the automatic executing file, the data management unit replaces the data read from the storage medium, which is a copy of at least a part of the automatic executing file, with a predetermined data and transmits the predetermined data to the computer host,
wherein when the computer host receives the predetermined data, none operation is executed by the computer host in response to the predetermined data.

2. The controller as claimed in claim 1, wherein the data management unit comprises:
a comparing unit, coupled to the microprocessor unit and configured to determine whether the data read from the storage medium by the computer host is the automatic executing file; and
a filter unit, coupled to the comparing unit and configured to replace the automatic executing file with a predetermined data and transmit the predetermined data to the computer host if the comparing unit determines the data read from the storage medium by the computer host is the automatic executing file.

3. The controller as claimed in claim 1, wherein the storage medium is a flash memory, and the first interface unit is a flash memory interface unit.

4. The controller as claimed in claim 1, further comprising an enabling/disabling unit coupled to the microprocessor unit and used to enable or disable the data management unit.

5. The controller as claimed in claim 1, further comprising a scan unit, coupled to the microprocessor unit and used to scan the storage medium for the automatic executing file according to a file allocation table (FAT) stored in the storage medium, wherein the scan unit records an address storing the automatic executing file in the storage medium as a tag address.

6. The controller as claimed in claim 5, wherein the data management unit determines whether the data read from the storage medium by the computer host is the automatic executing file according to the tag address.

7. The controller as claimed in claim 1, wherein the predetermined data is a random number or a fixed number with a specific information length.

8. A storage system having a function of preventing spread of computer viruses, comprising:
   a controller;
   a connector, coupled to the controller and configured to connect to a computer host having an operating system;
   a storage medium, coupled to the controller and configured to store data to be written by the computer host under control of the controller; and
   a data management unit, configured to read data from the storage medium,
   wherein the data management unit determines whether the data read from the storage medium is an automatic executing file,
   if the data read from the storage medium is the automatic executing file, the data management unit replaces the data read from the storage medium, which is a copy of at least a part of the automatic executing file, with a predetermined data and transmits the predetermined data to the computer host,
   wherein when the computer host receives the predetermined data, none operation is executed by the computer host in response to the predetermined data.

9. The storage system having a function of preventing spread of computer viruses as claimed in claim 8, wherein the data management unit is configured in the controller.

10. The storage system having a function of preventing spread of computer viruses as claimed in claim 8, wherein the data management unit is configured in the computer host.

11. The storage system having a function of preventing spread of computer viruses as claimed in claim 10, wherein the data management unit comprises:
   a comparing unit and configured to determine whether the data read from the storage medium by the computer host is the automatic executing file; and
   a filter unit and configured to replace the automatic executing file with a predetermined data and transmit the predetermined data to the computer host if the comparing unit determines the data read from the storage medium by the computer host is the automatic executing file.

12. The storage system having a function of preventing spread of computer viruses as claimed in claim 8, wherein the storage medium comprises a flash memory or a disk.

13. The storage system having a function of preventing spread of computer viruses as claimed in claim 10, further comprising an enabling/disabling unit coupled to the data management unit and configured to enable or disable the data management unit.

14. The storage system having a function of preventing spread of computer viruses as claimed in claim 10, wherein the data management unit is a high-level driver of a storage device driver.

15. The storage system having a function of preventing spread of computer viruses as claimed in claim 14, wherein the storage device driver further comprises a low-level driver, wherein the low-level driver is configured to collect the data read from the storage medium by the computer host and transmit the collect data to the high-level driver.

16. The storage system having a function of preventing spread of computer viruses as claimed in claim 10, wherein the data management unit is a hook application.

17. A method for preventing spread of computer viruses, comprising:
   reading data from the storage medium according to a read command received from an operating system of a computer host;
   determining whether the data read from the storage device is an automatic executing file; and
   if the data read from the storage medium is the automatic executing file, replacing the data read from the storage medium, which is a copy of at least a part of the automatic executing file, with a predetermined data and transmitting the predetermined data to the operating system,
   wherein when the operating system receives the predetermined data, none operation is executed by the operating system in response to the predetermined data.

18. The method for preventing spread of computer viruses as claimed in claim 17, further comprising:
   scanning the storage device for the automatic executing file according to a file allocation table (FAT) stored in the storage device; and
   recording an address storing the automatic executing file as a tag address when the automatic executing file is found.

19. The method for preventing spread of computer viruses as claimed in claim 18, wherein the step of determining whether the data read from the storage device is the automatic executing file comprise:
   determining whether the read command requests to read the data from the tag address; and
   identifying the data read from the storage device is the automatic executing file if the operating system reads the data from the tag address.

20. The method for preventing spread of computer viruses as claimed in claim 17, wherein the step of determining whether the data read from the storage device is the automatic executing file comprises:
   recognizing whether the data read from the storage device is the automatic executing file through a storage device driver configured in the operating system which is used to drive the storage device.

21. The method for preventing spread of computer viruses as claimed in claim 17, wherein the step of determining whether the data read from the storage device is the automatic executing file comprise:
   intercepting the data read from the storage device through a hook application that is configured in the operating system; and
   determining whether the data read by the operating system is the automatic executing file.

22. The method for preventing spread of computer viruses as claimed in claim 17, wherein the predetermined data is a random number or a fixed number with a specific information length.

* * * * *